United States Patent
Kobayashi et al.

[11] Patent Number: 6,099,630
[45] Date of Patent: Aug. 8, 2000

[54] INK COMPOSITION, REWRITABLE DISPLAY MEDIUM AND METHOD FOR DISPLAYING IMAGES

[75] Inventors: Takako Kobayashi; Hidehiko Soyama; Yutaka Sugizaki, all of Minami-Ashigara, Japan

[73] Assignee: Fuji Xerox Co., Ltd., Tokyo, Japan

[21] Appl. No.: 08/947,313

[22] Filed: Oct. 8, 1997

[30] Foreign Application Priority Data

Oct. 11, 1996 [JP] Japan .................................. 8-270308

[51] Int. Cl.$^7$ .................................................. C09D 11/02
[52] U.S. Cl. ..................................... 106/31.64; 106/31.65; 106/31.92
[58] Field of Search ........................ 106/31.25, 31.26, 106/31.64, 31.65, 31.92

[56] References Cited

U.S. PATENT DOCUMENTS

| | | | |
|---|---|---|---|
| 3,981,844 | 9/1976 | Romankiw | 252/62.52 |
| 4,409,039 | 10/1983 | Lepesant et al. | 106/31.25 |
| 4,933,249 | 6/1990 | Mikami | 430/98 |
| 5,534,587 | 7/1996 | Smith | 106/31.25 |
| 5,637,137 | 6/1997 | Okusa et al. | 106/31.26 |
| 5,779,777 | 7/1998 | Okuda et al. | 106/31.26 |

FOREIGN PATENT DOCUMENTS

| | | |
|---|---|---|
| B 51-10959 | 4/1976 | Japan . |
| 51-93827 | 8/1976 | Japan . |
| 52-6376 | 1/1977 | Japan . |
| B2 57-27463 | 6/1982 | Japan . |
| 60-201378 | 10/1985 | Japan . |
| 2-193185 | 7/1990 | Japan . |
| 4-58285 | 2/1992 | Japan . |
| 903724 | 8/1962 | United Kingdom ................ 106/31.25 |

OTHER PUBLICATIONS

Yamane, Ryuichiro. "Magnetic Fluid—Analogy with Electroheological Fluid." Proceedings of the Institute of Electrostatics of Japan, vol. 18, No. 6, pp 491–496, 1994, no month available.

*Primary Examiner*—Helene Klemanski
*Attorney, Agent, or Firm*—Oliff & Berridge, PLC

[57] ABSTRACT

The present invention discloses an ink composition which includes (1) the first ink containing the first solvent and the first colored particles having an affinity for the first solvent and dispersed in the first solvent and (2) the second ink containing the second solvent and the second colored particles having a color different from that of the first colored particles and having an affinity for the second solvent and dispersed in the second solvent, and which separates into two phases, and a rewritable display medium and methods for displaying images utilizing the ink composition.

The ink composition, the rewritable display medium and methods for displaying images provide sharp images with high resolution over time.

16 Claims, 5 Drawing Sheets

INK COMPOSITION, REWRITABLE DISPLAY MEDIUM AND METHOD FOR DISPLAYING IMAGES

BACKGROUND OF THE INVENTION

1. Field of the Invention

The present invention relates to an ink composition including at least two types of colored inks having different properties, a rewritable display medium utilizing the ink composition, and a method for displaying images.

2. Description of the Related Art

One known conventional rewritable display medium is a display medium in which an ink composition including a colorant is encapsulated and in which images are displayed and erased by moving the colorant. For example, Japanese Patent Application publication (JP-B) Nos. 51-10959 and 57-27463 and Japanese Patent Application Laid-Open (JP-A) No.2-193185 disclose display media in which magnetic particles are used as a colorant and in which images are displayed by applying a magnetic field to the magnetic particle to cause magnetic migration. In these display media, a dispersion of magnetic particles for display and masking particles having different colors is encapsulated and the magnetic particles are migrated by applying a magnetic field thereto so as to display and erase images.

However, this method has drawbacks: (1) a sharp image can not be displayed because the masking particles migrate along with the magnetic particles when displaying and erasing images and thus a mixture of those particles are present in image areas, and (2) images are erased incompletely and a background becomes dark because some magnetic particles surrounded by the masking particles can not migrate effectively when a magnetic field is applied.

JP-A Nos. 51-93827, 60-201378, and 4-58285 disclose a method in which a magnetic fluid is used in place of an ink and is caused to migrate. Referring to a magnetic fluid, Yamane has described in Proceedings of the Institute of Electrostatics of Japan Vol. 18, No. 6, p.491 (1994) that, in a magnetic fluid, superparamagnetic substances having mono magnetic domain structure and having particle diameters in the range from 10 to 100 nm are uniformly dispersed without aggregation as a result of addition of a surfactant.

JP-A No. 52-6376 discloses that, in the display medium utilizing the magnetic fluid, the magnetic fluid can be masked by another dispersion which does not dissolve the magnetic fluid, and can migrate to front of the display medium. However, the magnetic particles are eluted from the magnetic fluid over time because the surfactant adsorbed onto the particle surfaces is removed. In order to disperse particles, a great amount of the surfactant is usually added to the magnetic fluid used in the display medium. However, since the surfactant is physically absorbed on to the surface of the particles, the separation state is not permanently stable, and it is impossible to prevent magnetic particles and masking particles from being mixed with each other in the display medium. Further, since the magnetic particles in the magnetic fluid have small particle diameters, the magnetic fluid is somewhat transparent and has low coloring properties and therefore the display medium cannot provide high contrast.

In addition, a conventional display medium includes magnetic particles and masking particles dispersed in the same phase and mixed with each other. This creates that clear images having high contrast cannot be displayed.

SUMMARY OF THE INVENTION

The present invention has been conceived taking the above-described problem into consideration, and it is an object of the present invention to provide an ink composition with which clear images having high resolution can be exhibited, a rewritable display medium which can display clear images having high resolution and which is not deteriorated after repetitive use and which exhibits preferable characteristics in maintaining images, and a method for displaying images using the ink composition and the rewritable display medium.

The inventors made active studies and found that the above-described object can be achieved by completely separating displaying colored particles and masking particles and conceived the present invention.

According to a first aspect of the invention, there is provided an ink composition including the first ink in which the first colored particles are dispersed in the first solvent and the second ink in which the second colored particles are dispersed in the second solvent, the first and second colored particles having different colors, wherein the first and second solvents separate into two phases and the first colored particles have an affinity for the first solvent and the second colored particles have an affinity for the second solvent Further, according to a second aspect of the invention, there is provided a rewritable display medium which comprises the two sheet supports and an ink composition encapsulated in the two sheet supports and including the first and second inks and in which images are displayed and erased by applying energy to one of the first and second inks to cause the ink to migrate, at least one of the two sheet supports being transparent, and the first and second inks separating into two phases and having different colors.

Furthermore, according to a third aspect of the invention, there is provided a method for displaying images which utilizes a rewritable display medium comprising the two sheet supports and an ink composition, the ink composition encapsulated in the two sheet supports and including the first and second inks, at least one of the two sheet supports being transparent, and the first and second inks separating into two phases and having different colors, wherein at least one of the first and second inks includes magnetic particles and images are displayed and erased by applying a magnetic field to the ink including the magnetic particles to cause the ink to migrate.

In addition, according to a fourth aspect of the invention, there is provided a method for displaying images which utilizes a rewritable display medium comprising the two sheet supports and an ink composition, the ink composition encapsulated in the two sheet supports and including the first and second inks, at least one of the two sheet supports being transparent, and the first and second inks separating into two phases and having different colors, wherein at least one of the first and second inks includes a solvent which is in a solid state at room temperature, wherein images are displayed and erased by heating the rewritable display medium and the images are fixed by allowing the rewritable display medium to return to room temperature.

Clear images having high resolution can be exhibited with the ink composition of the present invention. The reason for this is that images are exhibited with the two types of particles having different hues (e.g. displaying particles and masking particles) and dispersed in the respective solvents separating into two phases in order to prevent the two types of particles from being mixed with each other. In order to obtain such an ink composition, two types of solvents which are not compatible are used and, for example, hydrophobic particles dispersed in a hydrophobic solvent and hydrophilic particles dispersed in a hydrophilic solvent are used as displaying particles and masking particles, respectively.

DETAILED DESCRIPTION OF THE PREFERRED EMBODIMENTS

The present invention will now be described in detail.

An ink composition according to the present invention includes two types of colored inks which have different colors and which separate into two phases. Images can be displayed and erased by using colored particles included in one of the colored inks and acting as displaying colored particles, and the other colored particles included in the other colored ink and acting as masking colored particles.

The two types of colored inks each include at least one solvent, and colored particles dispersed in the solvent. The solvent of one of the two inks is different from the solvent of the other ink and the color of the colored particles dispersed in one of the two inks is different from that of the colored particles contained in the other ink. Moreover, the two solvents separate out, and the colored particles should have an affinity for the solvent in which the particles are dispersed.

Figure 1:
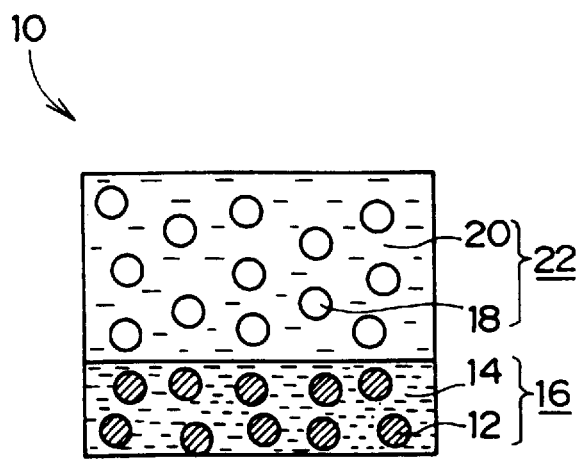
FIG. 1 is a view of a model showing phase separation in an ink composition according to the present invention.

FIG. 1 is a view of a model showing phase separation in an ink composition 10 according to the present invention. The ink composition 10 comprises a colored ink 16 in which displaying colored particles 12 are dispersed in a solvent 14 and a masking ink 22 in which masking colored particles 18 are dispersed in a solvent 20. Since the solvents 14 and 20 are not compatible, the colored ink 16 and the masking ink 22 separate into two phases without being mixed with each other.

Solvents that separate into two phases refers to solvents that are not compatible to each other. This is confirmed by strongly shaking the two types of solvents in a transparent cylinder at 25° C. and by visually checking, after leaving them at rest for 5 minutes, whether they separate into two phases with a clear interface between the phases. It is preferable to use a combination of solvents having different properties such as degrees of affinities, for example, a combination of a hydrophilic solvent and a hydrophobic solvent.

Specifically, such two types of solvents which separate into two phases may be a combination of solvents having the difference of SP values, as parameters indicating the solubility thereof, by 1.5 $(cal/cm^3)^{1/2}$ or more and preferably by 2 $(cal/cm^3)^{1/2}$ or more. Further, the colored particles dispersed in each solvent must have an affinity for the solvent. For example, colored particles having a hydrophobic surface whose surface tension is 40 dyn/cm or less and preferably 35 dyn/cm or less are dispersed in a solvent having a lower SP value, and colored particles having a hydrophilic surface whose surface tension is 45 dyn/cm or more and preferably 50 dyn/cm or more are dispersed in another solvent having a higher SP value.

An ink composition according to the present invention includes two types of inks each obtained by dispersing colored particles in the solvent. The color of the colored particles contained in one of the two inks is different from that of the colored particles contained in the other ink. Moreover the solvent in one of the two ink is different from the solvent in the other ink. In a rewritable display medium of the present invention, it is a common practice to use displaying colored particles and masking colored particles and to display and erase images by adjusting the positions thereof.

The displaying colored particles are preferably those which can change their positions in response to energy applied externally when used in a rewritable display medium (hereinafter occasionally referred to as "display medium"), e.g., magnetic particles.

A magnetic powder or a mixture thereof can be used as the magnetic particles used in an ink composition according to the present invention. For example, particles of ferromagnetic metals such as magnetites, iron, cobalt and nickel, or particles of alloys or compounds including the ferromagnetic metals are used. The size of the magnetic particles is preferably in the range between 0.1 μm and 10 μm in view of mobility due to magnetism, and image density. A fine mixture of a magnetic powder and a polymer, or a fine mixture of a magnetic powder, a polymer and a non-magnetic pigment can also be used, if necessary. Such a fine mixture can be prepared (1) by mixing the magnetic powder, the polymer, and, if present, the non-magnetic pigment, and pulverizing the resultant mixture, or (2) by polymerizing a mixture containing at least magnetic particles and a monomer by use of an emulsion polymerization method, a suspension polymerization method, or a dispersion polymerization method and pulverizing the polymer. In this case, it is preferable that a crosslinked polymer is used.

The masking colored particles are preferably optically impermeable particles which can completely mask displaying particles moved to an invisible region from the surface of a display medium when images are erased, and it is possible to use a pigment alone or to use a mixture thereof. For example, particles of pigments such as titanium oxide, zinc sulfide, lead titanate, zirconium oxide and white lead may be used, although the masking colored particles used in the present invention are not limited thereto. The size of the pigment particles is preferably between 0.1 μm and 10 μm in view of masking properties. In addition, a mixture including a pigment and a polymer may be used as needed.

Particles having a surface modified to become hydrophobic such as those having alkyl groups or fluoroalkyl groups on the surface thereof through covalent bonds are preferably used as the colored particles in one of the colored inks in an ink composition according to the present invention. If hydrophilic particles are used together with the above hydrophobic particles, it is possible to prevent mixing of the two types of colored inks. Further, in this case, since the two colored inks can stably separate into two phases without emulsifing or mixing, it is possible to prevent the displaying colored particles and the masking particles from being mixed with each other and to display images having clear contrast.

The introduction of alkyl groups or fluoroalkyl groups to the particles through covalent bonds as a preferable means for modifying the surfaces of the particles to provide the surface with hydrophobic nature can be carried out by a surface treatment of the particles utilizing a coupling agent. Coupling agents which can be used include silane coupling agents each having at least one alkyl group or fluoroalkyl group at the end or ends of each molecule and titanium coupling agents each having at least one alkyl group or fluoroalkyl group at the end or ends of each molecule.

Preferable silane coupling agents or titanium coupling agents have 1 to 20 carbon atoms in the alkyl groups or fluoroalkyl groups at the end or ends of molecules, and linear saturated alkyl groups are preferably used.

Specifically, such silane coupling agents include methyltrichlorosilane, methyldichlorosilane, dimethyldichlorosilane, trimethylchlorosilane, ethyltrichlorosilane, dibutylchlorosilane, dibutyldichlorosilane, diamyltrichlorosilane, amyldichlorosilane, amylmethyldichlorosilane, hexyltrichlorosilane, hexyldichlorosilane, hexylmethyldichlorosilane, heptyltrichlorosilane, heptylmethyldichlorosilane, octyltrichlorosilane, decyltrichlorosilane, decyldimethylchlorosilane, undecyltrichlorosilane, methyldodecyldichlorosilane, hexadecyldichlorosilane, hexadecyltrichlorosilane, octadecyltrichlorosilane, methyloctadecyldichlorosilane, methyltrimethoxysilane, dimethyldimethoxysilane, methylethoxysilane, methyltriethoxysilane, dimethylmethoxysilane, n-propyltrimethoxysilane, isobutyltrimethoxysilane, amyltriethoxysilane, hexyldimethoxysilane, hexyltrimethoxysilane, octyltriethoxysilane, decyltrimethoxysilane, methyldodecyldiethoxysilane, hexadecyltriethoxysilane, octadecyltrimethoxysilane, methyloctadecylethoxysilane, trifluoropropyltrichlorosilane, trifluoropropyltrimethoxysilane, trifluoropropyldimethylchlorosilane, trifluoropropylmethlydichlorosilane, trifluoropropylmethyldimethoxysilane, tridecafluorooctylmethyldichlorosilane, tridecafluorooctyldimethylchlorosilane, tridecafluorooctyltrichlorosilane, tridecafluorooctyltriethoxysilane, heptadecafluorododecyltrimethoxysilane, and heptadecafluorododecylmethyldimethoxysilane.

The titanium coupling agents include isopropyltriisostearyltitanate, isopropyltridodecylbenzensulfonyltitanate, isopropyltris (dioctylpyrophosphate) titanate, bis (dioctylpyrophosphate) oxyacetatetitanate, bis (dioctylpyrophosphate) ethylenetitanate, isopropyltrioctanoyltitanate, isopropyltri (dioctylphosphate) titanate, and diisostearylethylenetitanate.

Such a surface treatment agent is added in an amount in the range from 0.2 to 40 percent by weight and preferably from 0.5 to 20 percent by weight based on the weight of the colored particles. The amount less than 0.2 percent by weight will result in an insufficient hydrophobic nature of the surface, and an amount exceeding 40 percent by weight will not improve further the efficiency of the treatment.

In order to obtain a colored ink to be used in the ink composition, those colored particles should be dispersed in solvents. The solvents and colored particles which are used in combination preferably have an affinity for each other from the viewpoint of the stability of dispersion.

The colored particles which have been subjected to a surface treatment to provide hydrophobic nature, such as those including alkyl groups or fluoroalkyl groups on the surface thereof through covalent bonds as described above, are preferably dispersed in the solvent having more hydrophobic nature among the above-described two types of solvents. Examples of such a hydrophobic solvent include hydrocarbon compounds and halide compounds.

For example, hydrophobic solvents includes aliphatic hydrocarbons such as paraffin solvents including linear or blanched hexan, heptane, octane, nonane, decane, dodecane, tetradecane, hexadecane, octadecane, octacosane, Isopar H, Isopar M, and Isopar L (trade names) manufactured by Exxon Corp; monoethers having long-chain alkyl groups such as linear or branched dihexylether and dioctylether; alkylnaphthalene solvents such as KMC113 (trade name) manufactured by Kureha Chemical Industry Co., Ltd., and SAS-LH and SAS-296 (trade names) manufactured by Nippon Petrochemicals Co., LTD.; and fluorine-contained solvents including perfluoro compounds such as linear or branched perfluoroheptane, perfluorooctane, perfluorodecane and perfluorododecane, saturated hydrocarbon fluorides and monoether fluorides. They may be used alone or, if they completely dissolve in each other, in combination.

When colored inks are prepared, not only particles which have been subjected to a surface treatment as described above but also particles which have not been treated can be dispersed in these solvents.

A solvent for the other colored ink which is to be used in combination with a colored ink including colored particles having more hydrophobic surfaces is preferably a solvent which is more hydrophilic than the solvents described above in order to disperse therein colored particles which are hydrophilic. For example, the hydrophilic solvents include those having a plurality of polar groups such as hydroxyl groups and ether links in their structures, e.g., water, alcohols and ethers.

Such solvents having more hydrophilic nature include water, monoalcohols such as ethanol, propanol and butanol, polyethylene glycols such as ethylene glycol, diethylene glycol, triethylene glycol, diols such as trimethylene glycol, butanediol, pentanediol, hexanediol, heptanediol, octanediol and decanediol, ether compounds such as ethyleneglycol monomethylether, ethyleneglycol monoethylether, diethyleneglycol monomethylether, diethyleneglycol monoethylether and diethyleneglycol monobutylether, and glycerin. They may be used alone or, if they completely dissolve in each other, in combination.

Each of the above-described two types of solvents is not limited to a solvent which is liquid at room temperature and a compound which is liquefied through heating beyond the melting point may be used. Since a colored ink which includes a solvent (which is solid at room temperature and has a melting point greater than or equal to room temperature) and which is in a solid state at room temperature can be used in the present invention, it is possible to improve stability of display or erasure state (i.e., image retentivity) by heating the ink to liquefy it only when images are displayed or erased and thereafter solidifying it at room temperature.

Further, the combination of solvents used in the present invention is not limited to combinations of hydrophobic and hydrophilic solvents, and any combination of hydrophobic solvents or any combination of hydrophilic solvents may be used as long as there is a difference of 1.5 $(cal/cm^3)^{1/2}$ or more between the solubility parameters thereof.

An ink composition comprising colored inks which separate into two phases may comprise a combination of (1) a colored ink including the first colored particles which have alkyl groups or fluoroalkyl groups on the surface thereof through covalent bonds and which are dispersed in a hydrophobic solvent, and (2) a colored ink which is not mixed with the above colored ink and which includes the second colored particles (whose color is different from that of the first colored particles) and having neither alkyl groups nor fluoroalkyl groups on the surface thereof and dispersed in a hydrophilic solvent. However, the present invention is not limited thereto, and another ink composition may be used which comprises the following inks: (1) an ink comprising the first solvent having a lower SP value, and colored particles having relatively hydrophobic surfaces and being dispersed in the first solvent, (2) and an ink comprising the second solvent whose SP value is at least 1.5 $(cal/cm^3)^{1/2}$ higher than that of the first solvent, and colored particles having a surfaces more hydrophilic than the former and being dispersed in the second solvent.

Preferable compositions include (1) a combination of a colored ink obtained by dispersing colored particles, which have alkyl groups or fluoroalkyl groups on the surface thereof through covalent bonds, in a hydrophobic solvent containing a halogen such as a perfluoro compound, and a colored ink obtained by dispersing colored particles, which have neither alkyl group nor fluoroalkyl group on the surfaces thereof, in a hydrophilic solvent and (2) a combination of a colored ink obtained by dispersing colored particles, which have alkyl groups or fluoroalkyl groups on the surface thereof through covalent bonds, in a alkyl type hydrophobic solvent such as aliphatic hydrocarbon or alkyl naphthalene, and a colored ink obtained by dispersing colored particles, which have neither alkyl group nor fluoroalkyl group on the surfaces thereof, in a hydrophilic solvent such as water or a glycol. More preferable compositions include (a) a combination of a dispersion including a perfluoro compound and colored particles which have been surface-treated with a coupling agent to provide fluoroalkyl groups, and a dispersion including a diol and colored particles which have not been subjected to a surface treatment, (b) a combination of a dispersion including a perfluoro compound and colored particles which have been surface-treated with a coupling agent to provide fluoroalkyl groups, and a dispersion including a glycol and colored particles which have not been subjected to a surface treatment, (c) a combination of a dispersion including a saturated hydrocarbon compound and colored particles which have been surface-treated with a coupling agent to provide fluoroalkyl groups, and a dispersion including a glycol and colored particles which have not been subjected to a surface treatment, and (d) a combination of a dispersion including an alkyl naphtalene solvent and colored particles which have been surface-treated with a coupling agent to provide fluoroalkyl groups, and a dispersion including a glycol and colored particles which have not been subjected to a surface treatment.

A rewritable display medium according to the present invention will now be described. In a rewritable display medium according to the present invention, an ink composition as described above is encapsulated between two sheet supports, at least one of which is transparent, and energy is applied to either of the colored inks to move it, and thereby images are displayed and erased.

Any material can be used for the supports as long as the material can hold the ink composition image, but at least one support which is disposed at the front side of the display medium should be made of transparent material.

Materials for sheet supports include synthetic resins such as polyvinyl chloride, polyester, polycarbonate, polymethyl methacrylate, polystyrene, and polyethylene terephthalate, natural resins, paper, synthetic paper, metal thin films, and ceramics which may be appropriately chosen and used alone or as a complex according to the required properties such as strength, rigidity, masking characteristics, and optical impermeability. The material for the front side support is chosen among transparent materials. The rear side support serves as a substrate, and the material thereof may be transparent if desired but is preferably chosen among materials having excellent physical properties such as strength and rigidity.

Figure 2:
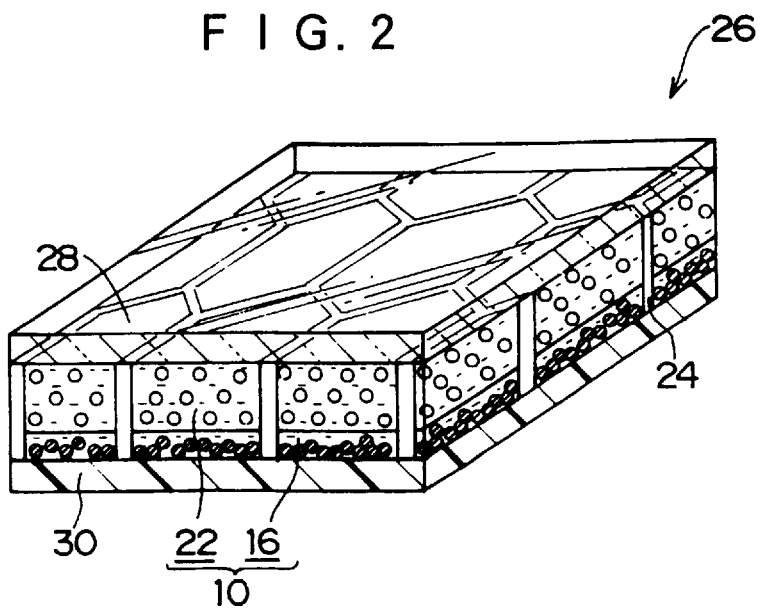
FIG. 2 is a view of a model showing a rewritable display medium including a honeycombed diaphragm according to the present invention.

The sheet supports include a card-like support and a film-like support. The two sheet supports in which the ink composition is encapsulated may be incorporated into an appropriate frame or a device having an energy application means. Further, a separation wall in the form of a honeycomb or the like may be provided between the two sheet supports as needed. FIG. 2 is a view of a model illustrating a rewritable display medium 26 having a honeycombed diaphragm 24. The rewritable display medium 26 comprises a transparent sheet support 28 disposed on the front side, a sheet support 30 serving as a substrate and disposed on the rear side, and an ink composition 10 encapsulated between the sheet supports 28, 30.

A method of forming images implemented in a rewritable display medium according to the present invention will now be described. An ink composition is encapsulated in the display medium, and each of colored inks contained in the ink composition and separating into two phases includes colored particles. Energy is applied imagewise to the displaying colored particles to cause the displaying colored ink to migrate toward the front side. The displaying colored ink is migrated toward the front side and replace the masking colored ink which has been there to thereby display images. Further, the displaying colored ink is similarly migrated to an invisible region of the display medium and the masking colored ink is moved to the front side (display surface side) when the images are erased.

Figure 3:
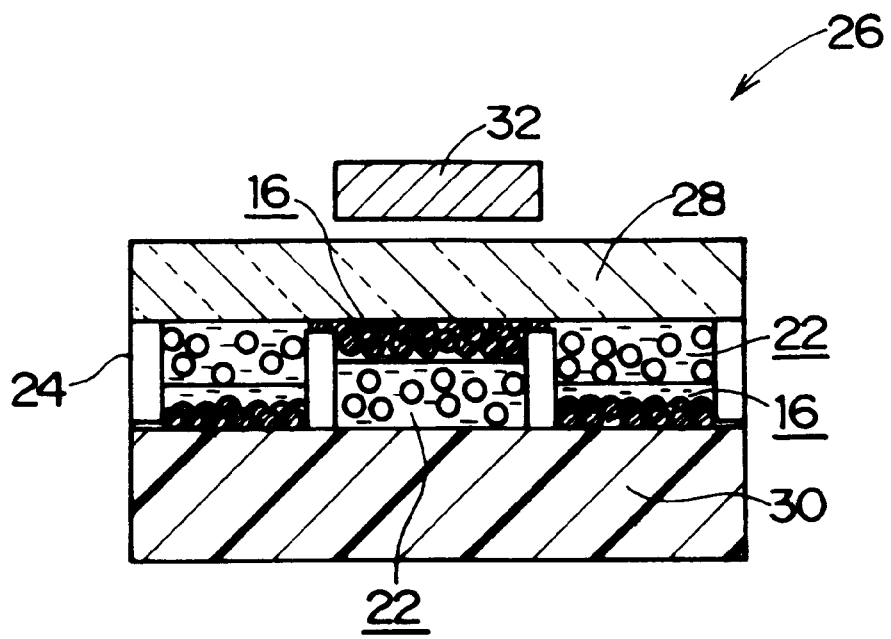
FIG. 3 is a sectional view of a model showing how images are displayed on a rewritable display medium by means of a magnet acting thereon from the side of a front sidethereof.

The simplest method will now be described in which magnetic particles are used as the displaying colored particles and a magnetic field is used as the energy. FIG. 3 is a view of a model showing a state in which an image is displayed on the display medium 26 utilizing a magnet 32. A magnetic field is applied by the magnet 32 to the display medium 26 from the front side 28 thereof in a pattern in accordance with the image to be displayed. Thus, a displaying colored ink 16 including magnetic particles dispersed therein is caused to migrate toward the front side, and replaces the masking colored ink 22 which has been on the front side 28, thereby displaying the image. When the migration of the displaying colored ink 16 is completed, the displaying colored ink 16 and masking colored ink 22 separate out. The magnetic field may be applied to the display medium from the front side thereof using any of methods utilizing a permanent magnet or a magnetic pen constituted by an electromagnet, direct application of a magnetic field utilizing a magnetic head, application of a magnetic field to a recording drum by a magnetic head, and contact between the medium and the recording drum.

Figure 4:
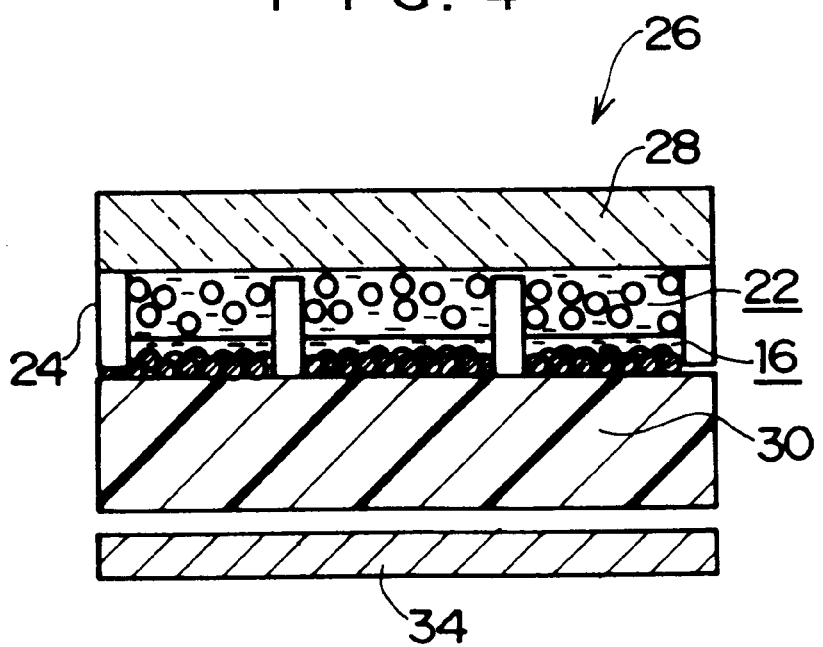
FIG. 4 is a sectional view of a model showing how images are erased on the rewritable display medium by means of a magnet acting thereon from the side of a rear surface thereof.

Displayed images can be erased by applying the magnetic field vertically to the entire display medium from the rear side thereof, attracting the displaying colored ink toward the invisible region (the rear side), and therefore replacing the displaying colored ink with the masking colored ink. FIG. 4 is a sectional view of a model showing a state in which images are erased by applying magnetic field due to the magnet 34 to the entire surface of the display medium 26 from the side of the sheet support 30 serving as a substrate located on the rear side of the rewritable display medium 26. The effect of the erasing magnet 34 applied to the display medium 26 from the rear side thereof causes the displaying colored ink 16 including magnetic particles dispersed therein to migrate toward the rear side that is, the invisible region and causes the masking colored ink 22 to move toward the entire front side 28. Thus, the images are erased.

In a display medium according to the present invention, a displayed state can be fixed by using a compound which is in a solid state at room temperature for the colored ink. In this case, images can be recorded and erased by applying a magnetic field with the display medium being heated. While the heating temperature of the display medium depends on the melting points of the solvents used in the ink composition, the temperature is preferably from 60° C. to 200° C. in view of the heat resistance of the material for the support of the display medium. Further, the display medium may be allowed to return to room temperature in such a state and thereby the display states of the images are fixed. Images which have been thus fixed will be stable over time.

In addition, when two types of colored inks having different specific gravities are used and at least one of the two is solid at room temperature (e.g. wherein at least one of the first and second inks has a melting point greater than or equal to room temperature), it is possible to erase and display images only by, once the colored inks have reached room temperature, placing the two colored inks so that the colored ink having a larger specific gravity is disposed on the other colored ink and heating the display medium to liquify the colored ink which is solid at room temperature and to change the positions of the two colored inks. In this case, the energy used for displaying or erasing images is thermal energy. In the case of such a method of displaying and erasing images utilizing a difference in specific gravities, it is preferable to provide a diaphragm between the sheet supports of the display medium from the viewpoint of sharpness of the images thus obtained.

When the ink composition contains no component which is solid at room temperature (for example, when the ink composition has plastic flow properties) and, as one type of the colored particles, magnetic particles, a method utilizing an application of a magnetic field can be used as a method for displaying and erasing images. Moreover, when the ink composition contains a component which is solid at room temperature, a method utilizing heat can be used as a method for displaying and erasing images. Further, when the ink composition contains a component which is solid at room temperature and magnetic particles, a method in which heat is applied to the entire of the display medium and a magnetic field is applied only to the portions to be displayed or erased, or in which heat is applied only to the portions to be displayed or erased and a magnetic field is applied overall or partially to the display medium can be used as a method for displaying and erasing images. All of theses methods for displaying and erasing images in the rewritable display medium of the present invention are easy to implement. However, the other method can be used in the present invention.

EXAMPLES

The present invention will now be described with reference to preferred embodiments of the same. The term "part" used in the description of the embodiment refers to "part by weight" unless otherwise specified.

Preparation of Colored Particles

A surface treatment was carried out on colored particles to be used in an ink composition according to the invention.

Surface Treatment 1

| | |
|---|---|
| magnetic particles (MTH009F manufactured by Toda Kogyo Corp.) | 30 parts |
| heptadecafluorodecyltrimethoxysilane | 1 part |
| toluene | 105 parts |

The above composition was agitated for 2 hours at room temperature with ultrasonic waves applied thereto. After supernatant fluid was decanted, the magnetic particles were dried for 4 hours in a vacuum dryer set at 80° C. to obtain Magnetic Particles A having hydrophobic surfaces to which fluoroalkyl groups are covalently bonded.

Surface Treatment 2

| | |
|---|---|
| titanium oxide (JR602 manufactured by Tayca Corporation) | 30 parts |
| heptadecafluorodecyltrimethoxysilane | 1 part |
| toluene | 105 parts |

Titanium Oxide B having hydrophobic surfaces to which fluroalkyl groups are bonded through covalent bonds was obtained in the same manner as in Surface Treatment 1 except that the above composition was substituted for the composition in Surface Treatment 1.

Surface Treatment 3

| | |
|---|---|
| magnetic particles (MTH009F manufactured by Toda Kogyo Corp.) | 30 parts |
| isopropyltriisostearyltitanate | 0.5 parts |
| toluene | 105 parts |

Magnetic Particles C having hydrophobic surfaces to which alkyl groups are covalently bonded was obtained in the same manner as in Surface Treatment 1 except that the above composition was substituted for the composition in Surface Treatment 1.

Surface Treatment 4

| | |
|---|---|
| titanium oxide (JR602 manufactured by Tayca Corporation) | 30 parts |
| isopropyltriisostearyltitanate | 0.5 parts |
| toluene | 105 parts |

Titanium Oxide D having hydrophobic surfaces to which alkyl groups are bonded through covalent bonds was obtained in the same manner as in Surface Treatment 1 except that the above composition was substituted for the composition in Surface Treatment 1.

Example 1

1. Preparation of an Ink

| Magnetic Particles A having hydrophobic surfaces | 3 parts |
|---|---|
| perfluorooctane | 7 parts |

The above composition was agitated for 30 minutes at 80° C. to obtain a black ink (displaying ink).

| titanium oxide JR800 (manufactured by Tayca Corporation) | 3 parts |
|---|---|
| decanediol | 7 parts |

The above composition was agitated for 30 minutes at 80° C. to obtain a white ink (masking ink).

5 g of each of the above colored inks was put in a 25 ml test tube having a cap, manually shaked for 30 seconds at 80° C. and kept at rest. An ink composition was thus obtained.

2-1 Manufacture of a Cell Sample for Evaluation

Figure 5:
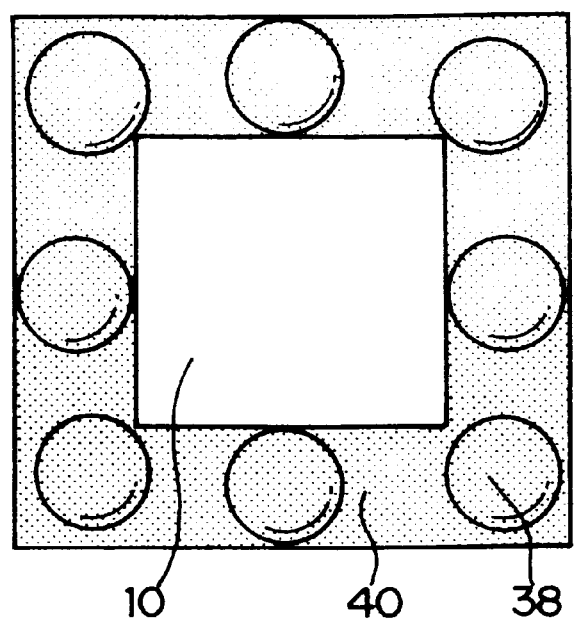
FIG. 5 is a plan view of a cell sample for evaluating an ink composition which sample is used in Example 1.
Figure 6:
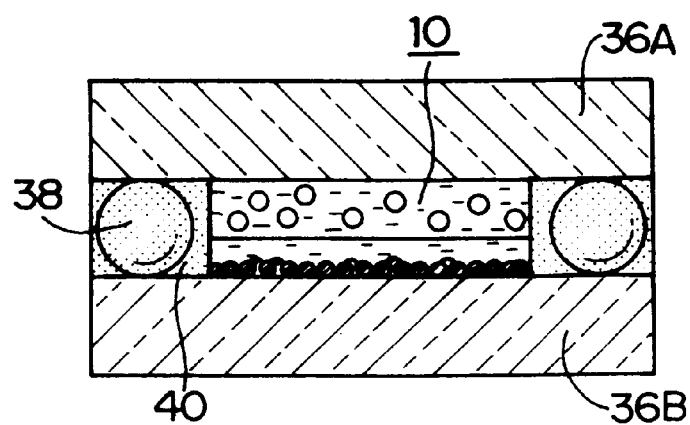
FIG. 6 is a sectional view of the cell sample of FIG. 5.

A cell sample 42 for evaluating an ink composition was obtained by encapsulating the ink composition 10 in a glass cell comprising two glass plates 36A, 36B which were 25 mm×25 mm×1 mm in size and whose surfaces were treated with fluorine and, as spacers, glass beads having diameters of 1 mm and fixed between the frame portions of the glass plates 36A, 36B with epoxy adhesive 40. FIG. 5 is a plan view of the cell sample 42 for evaluating the ink composition 10 used in Example 1. FIG. 6 is a sectional view of the cell sample 42.

2-2 Evaluation of the Ink Composition

Figure 7:
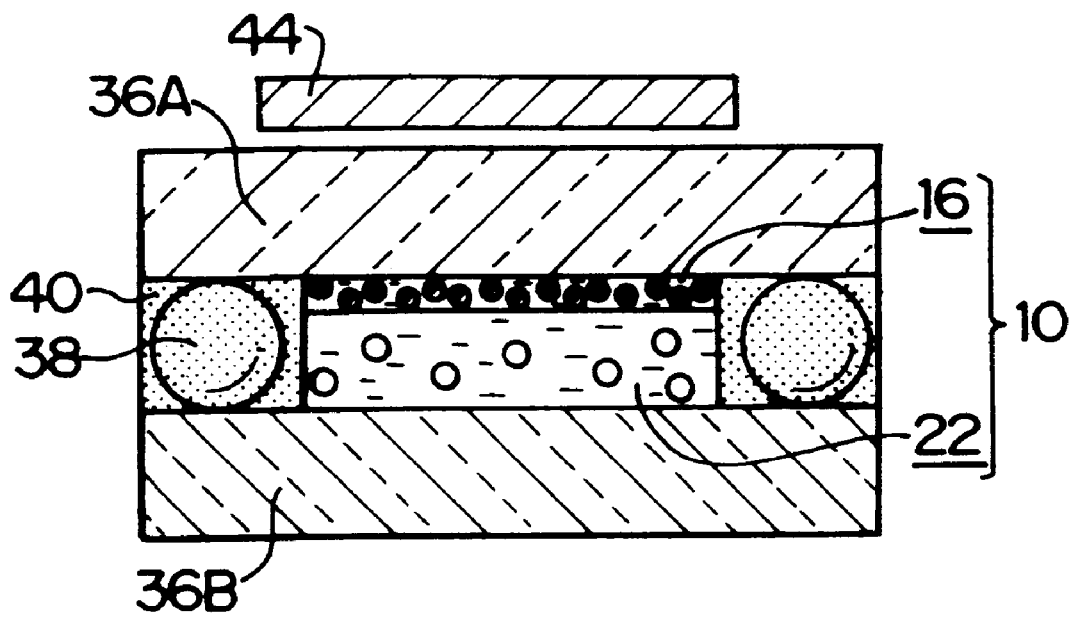
FIG. 7 is a sectional view of a model showing a state in which a magnetic field is applied to the cell sample of FIG. 5 by means of a magnet.

The cell sample 42 obtained as described above was place on a hot plate heated to 80° C. and, after applying a magnet 44 on the entire surface thereof, was cooled to room temperature. The ink 16 was moved to the front side and fixed in the state. A black surface was observed by naked eyes on the front side FIG. 7 is a sectional view of the model showing a state in which a magnetic field is applied by the magnet 44 to the cell sample 42 for the evaluation of the ink composition 10.

Optical reflection densities were measured on the surface to which the magnet was applied (hereinafter referred to as "front surface") and the surface to which the magnet was not applied (hereinafter referred to as "rear surface") using an optical reflection densitometer 404A manufactured by X-Rite corp. The optical densities of the front and rear surfaces after an image was displayed were 1.40 and 0.25, respectively, the ink composition 10 preferably separated into two phases. Ultrasonic waves were applied for 30 minutes to the sample while the sample heated to 80° C. to mix the two phases vigorously and, thereafter, evaluation was made with the magnet acting on the cell as described above. As a result, the application of a magnetic field after the application of ultrasonic waves resulted in optical densities of 1.38 and 0.25 on the front and rear surfaces, respectively, which again indicated preferable separation into two phases.

3-1 Manufacture of a Reversible Display Medium

A display medium was obtained by encapsulating the ink composition obtained according to Example 1 in a vessel comprising a transparent fluorine-contained resin film having a thickness of 20 μm (manufactured by Asahi Glass Co., Ltd.) as a front plate, a polystyrene sheet having a thickness of 30 μm as a rear plate, and, as a spacer, a honeycombed diaphragm made of polyester and having a thickness of 0.1 mm and a hole diameter of 3 mm and fixed between the frame portions of the front and rear plates with epoxy adhesive.

3-2 Evaluation of the Reversible Display Medium

This display medium was heated to 80° C., and the magnetic particles were attracted toward the rear surface by a magnetic field uniformly applied on the rear surface. Thereafter, a magnetic pen having a magnet on the tip thereof was operated on the front side to draw an image, and the medium was then cooled to room temperature. Further, the medium was heated to 80° C. and a magnet for erasure was applied thereto from the rear surface to erase the image. After repeating such operations of displaying and erasing images 500 times, an image was made to be displayed on the display medium and an image density and a background density were measured using the optical reflection densitometer 404A manufactured by X-Rite Corp. The image density and the background density were 1.40 and 0.25, respectively. This proved that a display medium according to the invention utilizing the ink composition which separated into two phases could display images having clear contrast even after repeating display and erasure 500 times. Further, from the observation of the operations, it was confirmed that displayed images were completely erased.

Further, a magnetic field was externally applied using a magnet for erasure to a displayed image which had been cooled to room temperature from the rear side thereof. This resulted in no change in the image, and revealed that images cooled to room temperature were fixed and stable even if a magnetic field was externally applied thereto at room temperature. The displayed image was still sharp a week later.

Example 2

1. Preparation of an Ink

| magnetic particles (MTH009F manufactured by Toda Kogyo Corp.) | 3 parts |
|---|---|
| ethylene glycol | 7 parts |

A black ink was obtained in the same manner as in Example 1 except that the above composition was substituted for the composition in Example 1.

| titanium oxide B having a hydrophobic surface | 3 parts |
|---|---|
| perfluorododecane | 7 parts |

A white ink was obtained in the same manner as in Example 1 except that the above composition was substituted for the composition in Example 1.

2. Manufacture of a Cell Sample for Evaluation and Evaluation of the Ink Composition An ink composition and a cell sample for evaluating the ink composition were prepared in the same manner as in Example 1 except that the above inks were substituted for the two ink used in Example 1. The sample thus produced had optical densities of 1.28 and 0.23 on the front and rear surfaces thereof, respectively, and the ink composition preferably separated into two phases. Further, evaluation was made after mixing the two phases in the same manner as in Example 1. As a result, the sample exhibited optical densities of 1.30 and 0.25 on the front and rear surfaces, respectively, even after the application of ultrasonic waves for 30 minutes, which indicated preferable separation into two phases.

3. Manufacture of a Display Medium and Evaluation of Images

A display medium was produced in the same manner as in Example 1 except that the above-described ink composition was substituted for the ink composition in Example 1, and images displayed thereon were evaluated in the same way as in Example 1. The image density and the background density were 1.26 and 0.26, respectively, and thus images having clear contrast could be displayed. Further, the images were completely erased by the application of a magnetic field for erasure. No change occurred in the displayed image even when an external magnetic field was applied to the image, and the displayed image was still sharp a week later.

In Example 2, it was possible to erase images without applying a magnetic field by, after an image was displayed and fixed, placing the rewritable display medium so that the front side was disposed at the upper side and heating the rewritable display medium to 80° C. because the specific gravity of the black ink was larger than that of the white ink.

Comparative Example 1

1. Preparation of an Ink

| | |
|---|---|
| magnetic particles (MTH009F manufactured by Toda Kogyo Corp.) | 3 parts |
| titanium oxide (JR602 manufactured by Tayca Corp.) | 5 parts |
| paraffin wax 2305 (manufactured by Mobil Sekiyu K.K.) | 12 parts |
| aluminum stearate | 0.5 parts |

The above composition was agitated for 30 minutes at 80° C. to obtain an ink composition.

2. Manufacture of a Cell Sample for Evaluation and Evaluation of the Ink Composition The resultant ink composition was encapsulated between two glass plates to produce a cell sample and the cell sample was evaluated in the same manner as in Example 1. As a result, titanium oxide (masking colored particles) moved along with the magnetic particles (displaying colored particles) in response to the application of a magnetic field, resulting in a mixture of these particles. The measured optical densities of the front and rear surfaces were 0.70 and 0.46, respectively, which indicated lower darkness compared to the above-described examples.

Further, evaluation after applying ultrasonic waves revealed that there were unmoved particles in some regions and that the ink composition did not separate into two phases. As a result, optical densities of the front surface and rear surface were 0.65 and 0.50, respectively, which provide a small difference in optical density between the front and rear surfaces.

3. Manufacture of a Display Medium and Evaluation of Images

A display medium was produced in the same manner as in Example 1 except that the above-described ink composition was substituted for the ink composition in Example 1, and images displayed thereon were evaluated in the same way as in Example 1. It exhibited an optical density of 0.72 at the image area and showed an unclear image due to titanium oxide for masking which existed in the image area. The magnetic particles remained in some parts of the image area even after the image was erased instead of moving toward the rear surface. As a result, the medium had a background density of 0.50 and some dark areas remained in the front surface.

Comparative Example 2

1. Preparation of an Ink

Marpomagna PF3020 (manufactured by Matsumoto Yushi-Seiyaku Co., Ltd.) which is a commercially available magnetic fluid was used as a black ink.

| | |
|---|---|
| titanium oxide JR800 (manufactured by Tayca Corp.) | 3 parts |
| decanediol | 7 parts |

A white ink was prepared in the same manner as in Example 1 except that the above composition was substituted for the composition in Example 1, and an ink composition was obtained by combining it with the above black ink.

2. Manufacture of a Cell Sample for Evaluation and Evaluation of the Ink Composition A cell sample was obtained in the same manner as in Example 1 except that the above ink composition was substituted for the ink composition in Example 1 and evaluated in the same way as in Example 1. The sample exhibited optical densities of 0.90 and 0.35 on the front and rear surfaces thereof immediately after preparation. When ultrasonic waves were applied to this cell sample, the magnetic particles formed small droplets as a result of an effect of a surfactant included in the magnetic fluid as a particle dispersant and, thereafter, the magnetic particles eluted. This resulted in magnetic particles which were not moved by the effect of a magnet and thus resulted in optical densities of 0.65 and 0.62 on the front surface and the rear surface, respectively. Thus, the magnetic particles and titanium oxide were mixed instead of separating into two phases in this sample.

3. Manufacture of a Display Medium and Evaluation of Images

Further, a display medium was produced in the same manner as in Example 1 except that the ink composition of Comparative Example 2 was substituted for the ink composition in Comparative Example 1, and images displayed thereon were evaluated in the same way as in Example 1. It exhibited an optical density of 0.72 at the image area and a background density of 0.45 and failed to provide images having high contrast.

(Change in Optical Density due to an Effect of Ultrasonic Waves)

Figure 8:
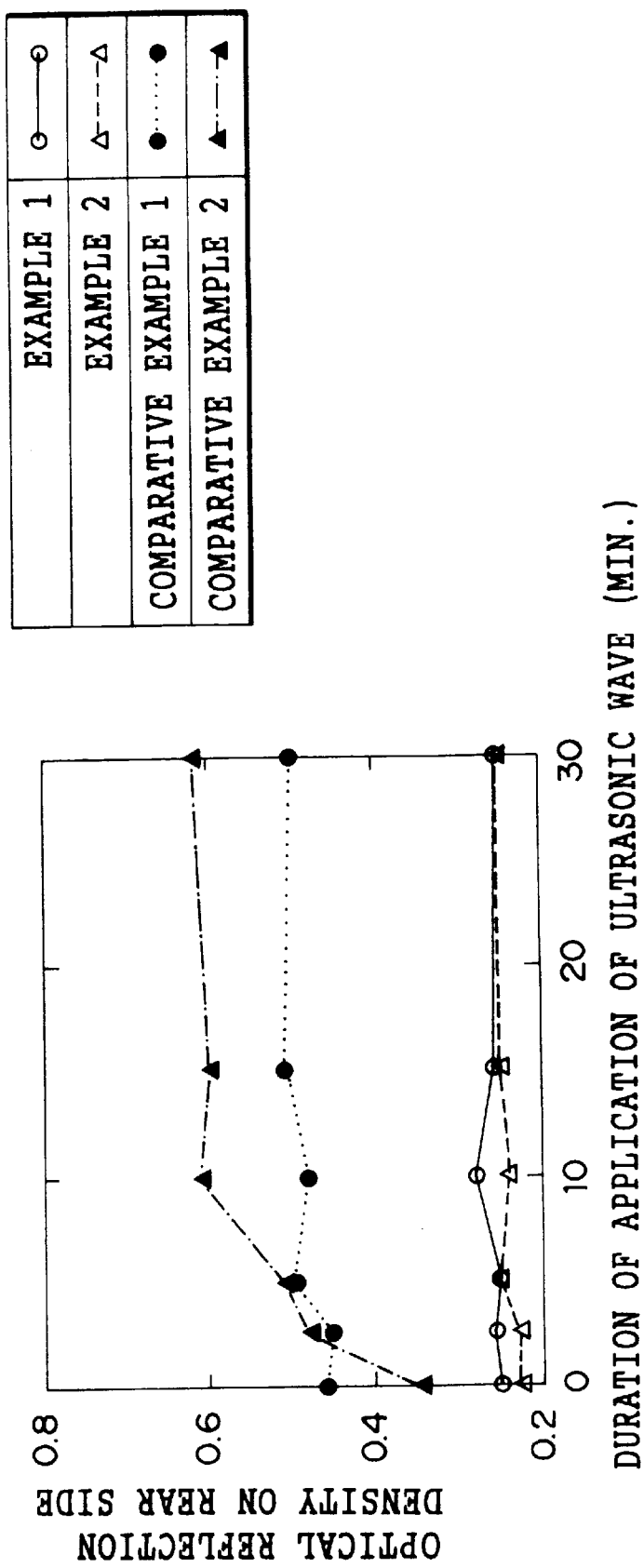
FIG. 8 is a graph showing the relationship between the duration of application of ultrasonic waves to an ink composition encapsulated in the cell sample and the optical density on the rear surface.

FIG. 1 shows measured optical densities of the rear side (white region) of the cell samples obtained in Examples 1 and 2 and Comparative Examples 1 and 2, after applying ultrasonic waves and then applying a magnet from the rear side to the cell samples. FIG. 8 is a graph showing changes in the optical density of the rear side relative to changes in the duration of the application of ultrasonic waves. It was confirmed that the ink compositions obtained in Examples 1 and 2 of the present invention exhibited substantially little change in the optical densities no matter whether ultrasonic waves were applied or not and had stable low optical densities because the magnetic particles dispersed in the black inks moved along with the black inks and therefore all magnetic particles can be made to migrate, when a magnetic field was applied thereto. On the other hand, the ink compositions of Comparative Examples 1 and 2 exhibited an increase in the optical densities due to application of ultrasonic waves, because the ink compositions after the application of ultrasonic waves were mixed and did not separate into two phases having diifferent colors effectively even when the magnetic field was applied thereto using the magnet.

Example 3

1. Preparation of an Ink

| | |
|---|---|
| magnetic particles C having surfaces treated to provide hydrophobic nature | 3 parts |
| alkyl naphthalene (KMC113 manufactured by Kureha Chemical Industry Co., Ltd.) | 7 parts |

A black ink was prepared in the same manner as in Example 1 except that the above composition was substituted for the composition in Example 1.

| | |
|---|---|
| titanium oxide (JR800 manufactured by Tayca Corp.) | 5 parts |
| ethylene glycol | 5 parts |

A white ink was prepared in the same manner as in Example 1 except that the above composition was substituted for the composition in Example 1, and an ink composition was obtained from these inks in the same manner as in Example 1.

2. Manufacture of a Cell Sample for Evaluation and Evaluation of the Ink Composition A cell sample was obtained in the same manner as in Example 1 except that the above ink composition was substituted for the ink composition in Example 1 and evaluated in the same way as in Example 1. The ink composition exhibited optical densities of 1.26 and 0.26 on the front and rear surfaces thereof, respectively, and exhibited preferable separation into two phases. Further, even after application of ultrasonic waves for 30 minutes, it exhibited optical densities of 1.28 and 0.24 on the front and rear surfaces, respectively, which indicated preferable separation into two phases.

3. Manufacture of a Display Medium and Evaluation of Images

A display medium was produced in the same manner as in Example 1 except that the above-described ink composition was substituted for the ink composition in Example 1, and images displayed thereon were evaluated in the same way as in Example 1. The image and background densities were 1.26 and 0.25 respectively, and thus images having clear contrast could be displayed in a similar fashion to that of Example 1. Further, the images could be completely erased. The displayed image was retained but sharpness thereof deteriorated after being left at rest for one week.

Example 4

1. Preparation of an Ink

| | |
|---|---|
| magnetic particles (MTH009F manufactured by Tayca Corp.) | 3 parts |
| ethylene glycol | 7 parts |

A black ink was prepared in the same manner as in Example 1 except that the above composition was substituted for the composition in Example 1.

| | |
|---|---|
| titanium D having a surface treated to provide hydrophobic nature | 3 parts |
| octacosane | 5 parts |

A white ink was prepared in the same manner as in Example 1 except that the above composition was substituted for the composition in Example 1, and an ink composition was obtained from these inks in the same manner as in Example 1.

2. Manufacture of a Cell Sample for Evaluation and Evaluation of the Ink Composition A cell sample was obtained in the same manner as in Example 1 except that the above ink composition was substituted for the ink composition in Example 1 and evaluated in the same way as in Example 1. As a result, it exhibited optical densities of 1.15 and 0.30 on the front and rear surfaces thereof, respectively, and exhibited preferable separation into two phases immediately after the fabrication. Further, even after application of ultrasonic waves for 30 minutes, it exhibited optical densities of 1.10 and 0.34 on the front and rear surfaces, respectively, which indicated preferable separation into two phases.

3. Manufacture of a Display Medium and Evaluation of Images

A display medium was produced in the same manner as in Example 1 except that the above-described ink composition was substituted for the ink composition in Example 1, and images displayed thereon were evaluated in the same way as in Example 1. The image density and the background density were 1.08 and 0.30, respectively, and thus images having clear contrast could be displayed ina similar fashion to that of Example 1. Further, the displayed image was still sharp one week later.

Comparative Example 3

1. Preparation of an Ink

| | |
|---|---|
| magnetic particles MTH009F | 3 parts |
| alkyl naphthalene (KMC113 manufactured by Kureha Chemical Industry Co., Ltd.) | 7 parts |
| sodium dodecylbenzensulfonate (DBS) | 0.05 parts |

A black ink was prepared in the same manner as in Example 1 except that the above composition was substituted for the composition in Example 1.

| titanium oxide JR800 (manufactured by Tayca Corp.) | 5 parts |
| --- | --- |
| ethylene glycol | 5 parts |

A white ink was prepared in the same manner as in Example 1 except that the above composition was substituted for the composition in Example 1, and an ink composition was obtained from these inks in the same manner as in Example 1.

2. Manufacture of a Cell Sample for Evaluation and Evaluation of the Ink Composition A cell sample was obtained in the same manner as in Example 1 except that the above ink composition was substituted for the ink composition in Example 1 and evaluated in the same way as in Example 1. It exhibited optical densities of 0.55 and 0.45 on the front and rear surfaces thereof, respectively, immediately after fabrication. Two ink phases having different colors were mixed with each other because a surfactant was used to disperse the magnetic particles. As a result of evaluation after application of ultrasonic waves, it exhibited optical densities of 0.56 and 0.49 on the front and rear surfaces, respectively, and the ink composition could not separate into two phases.

3. Manufacture of a Display Medium and Evaluation of Images

A display medium was produced in the same manner as in Example 1 except that the above-described ink composition was substituted for the ink composition in Example 1, and images displayed thereon were evaluated in the same way as in Example 1. The image density and the background density were 0.50 and 0.48, respectively, and thus it was not possible to display images.

Table 1 shown below indicates the evaluation results of the display media of Examples and Comparative Examples and the SP values of the solvents used in each ink composition.

Since a difference between the image density and a background density should be 0.75 or more in order to display clear images, the evaluation of the contrast of a display medium having a difference of 0.75 or more is marked by ○, and that of a display medium having a difference less than 0.75 and therefore displaying unclear images is marked by ×.

TABLE 1

| | Ink composition | | | Evaluation of display media | | |
| --- | --- | --- | --- | --- | --- | --- |
| | Displaying ink (particles/ solvent) | Masking ink (particles/ solvent) | State of phase separation | Image density | Background density | Contrast (difference in optical densities) |
| Example 1 | Hydrophobic magnetic particles A Perfluoro-octane (SP value: 5.8) | Titanium oxide Decandiol (SP value: 9.2) | Separation into two phases/clear interface and selective particle dispersion | 1.40 | 0.25 | 1.15 (○) |
| Example 2 | Magnetic particles (MTH009F) Ethylene glycol (SP value: 14.2) | Titanium oxide B having a hydrophobic surface Perfluoro-dodecane (SP value: 5.9) | Separation into two phases/clear interface and selective particle dispersion | 1.26 | 0.26 | 1.00 (○) |
| Example 3 | Hydrophobic magnetic particles C Alkyl naphthalene (SP value:8.5) | Titanium oxide (JR 800) Ethylene glycol (SP value: 14.2) | Separation into two phase/clear interface and selective particle dispersion | 1.25 | 0.25 | 1.00 (○) |
| Example 4 | Magnetic particles (MTH009F) Ethylene giycol (SP Value: 14.2) | Titanium oxide D having a hydrophobic surface Octacosane (SP Value: 7.8) | Separation into two phases/clear interface and selective particle dispersion | 1.08 | 0.30 | 0.78 (○) |
| Comparative example 1 (note 1) | Magnetic particles (MTH009F) Paraffin wax (SP value: 7.9) | Titanium oxide (JR 602) | One emulisified phase/mixed particles | 0.72 | 0.50 | 0.22 (X) |
| Comparative example 2 (note 2) | Magnetic fluid (marpomagna PF3020) (SP value: 6.0) | Titanium oxide (JR 800) Decanediol (SP value: 9.2) | Separation into two phases/unclear interface and mixed particles | 0.65 | 0.45 | 0.20 (X) |
| Compara- | Magnetic | Ethylene glycol | Separation into two | 0.50 | 0.48 | 0.02 |

TABLE 1-continued

| | Ink composition | | | Evaluation of display media | | |
|---|---|---|---|---|---|---|
| | Displaying ink (particles/ solvent) | Masking ink (particles/ solvent) | State of phase separation | Image density | Back-ground density | Contrast (difference in optical densities) |
| tive example 3 | particles (MTH009F) Alkyl naphthalene (SP value: 8.5) | (SP value: 14.2) Decandiol (SP value:9.2) | phases/unclear interface and mixed particles | | | (X) |

(Note 1)
Magnetic particles for dispiay (black) and titanium particles for masking (white) are despersed in the same solent.
(Note 2)
SP value shown in the column of magnetic fluid is the SP value of the solvent used in the magnetic fluid.

From the above table and the results of evaluation on the above-described Examples, it was found that the display media utilizing the ink composition of the present invention comprising two inks having different colors and separating into two phases had higher contrast and could display clearer images than those of the Comparative Examples. Further, it was confirmed that an external force such as ultrasonic waves did not deteriorate the separation property of the ink compositions and did not have adverse effects on the sharpness (acuity) of the displayed images.

Furthermore, the display media including at least one colored ink which was solid at room temperature according to Example 1, 2 or 3 retained displayed images more preferably than that in Example 3 comprising only colored inks which were liquid at room temperature. This indicates that an ink composition according to the present invention preferably includes an ink which is solid at room temperature.

What is claimed is:

1. An ink composition for displaying images, comprising a first ink having a first solvent in which first colored particles are dispersed and a second ink having a second solvent in which second colored particles are dispersed, the first and second colored particles having different colors,
   wherein the ink composition is devoid of a emulsifier, the first and second solvents separate into two phases, said first colored particles have an affinity for the first solvent, said second colored particles have an affinity for the second solvent, and said images are formed by contrast between colors of said first and second colored particles.

2. The ink composition according to claim 1, wherein the difference between the solubility parameters of the first and second solvents is 1.5 $(cal/cm^3)^{1/2}$ or more.

3. The ink composition according to claim 1, wherein one of the first and second colored particles are displaying particles and the other are masking particles.

4. The ink composition according to claim 1, wherein either of the first and second solvents is hydrophobic.

5. The ink composition according to claim 1, wherein either of the first and second colored particles have alkyl groups or fluoroalkyl groups on the surface thereof through covalent bonds.

6. The ink composition according to claim 5, wherein the colored particles having alkyl groups or fluoroalkyl groups on the surface thereof through covalent bonds are obtained by treating the surfaces of the colored particles with a silane coupling agent having an alkyl group or a fluoroalkyl group at at least one end or a titanium coupling agent having an alkyl group or a fluoroalkyl group at at least one end.

7. An ink composition comprising a first ink having a first solvent in which first colored particles are dispersed and a second ink having a second solvent in which second colored particles are dispersed, the first and second colored particles having different colors,
   wherein the first and second solvents separate into two phases and the first colored particles have an affinity for the first solvent and the second colored particles have an affinity for the second solvent;
   wherein either of the first and second colored particles are magnetic particles.

8. An ink composition comprising a first ink having a first solvent in which first colored particles are dispersed and a second ink having a second solvent in which second colored particles are dispersed, the first and second colored particles having different colors,
   wherein the first and second solvents separate into two phases and the first colored particles have an affinity for the first solvent and the second colored particles have an affinity for the second solvent;
   wherein at least one of the first and second solvents is a solvent which is in a solid state at room temperature and which has a melting point greater than or equal to room temperature.

9. A rewritable display medium which comprises two sheet supports at least one of which is transparent, and the ink composition of claim 1 encapsulated in the two sheet supports, and in which images are displayed and erased by applying energy to one of the first and second inks to cause the first and second inks to migrate.

10. The rewritable display medium according to claim 9, wherein the difference between the solubility parameters of the first and second solvents is 1.5 $(cal/cm^3)^{1/2}$ or more.

11. The rewritable display medium according to claim 9, wherein either of the first and second colored particles have alkyl groups or fluoroalkyl groups on the surface thereof through covalent bonds.

12. The rewritable display medium according to claim 11, wherein the colored particles having alkyl groups or fluoroalkyl groups on the surface thereof through covalent bonds are obtained by treating the surfaces of the colored particles with a silane coupling agent having an alkyl group or a fluoroalkyl group at at least one end or a titanium coupling agent having an alkyl group or a fluoroalkyl group at at least one end.

13. The rewritable display medium according to claim 9, wherein either of the first and second colored particles are magnetic particles and the application of energy is carried out through a magnetic field.

14. The rewritable display medium according to claim 9, wherein at least one of the first and second inks has a melting point greater than or equal to room temperature.

15. A method for displaying images comprising:
preparing the rewritable display medium of claim 9, with either of the first and second colored particles being magnetic particles, and
displaying images by applying a magnetic field to the ink including the magnetic particles to cause the first and second inks to migrate.

16. A method for displaying images comprising:
preparing the rewritable display medium of claim 9, with either of the first and second solvents being a solvent which is in a solid state at room temperature, and
displaying images by heating and allowing the rewritable display medium to return to room temperature.

* * * * *